United States Patent [19]

Standish et al.

[11] Patent Number: 5,347,808
[45] Date of Patent: Sep. 20, 1994

[54] JET-ENGINE THRUST REVERSERS

[75] Inventors: Robert Standish, Gazeran; Joël Frank; Pascal Meyer, both of Paris, all of France

[73] Assignee: Societe de Construction des Avions Hurel-Dubois, Meudon la Foret, France

[21] Appl. No.: 901,668

[22] Filed: Jun. 22, 1992

[30] Foreign Application Priority Data

Jun. 24, 1991 [FR] France .................... 91 07715

[51] Int. Cl.[5] .............................. F02K 3/02
[52] U.S. Cl. ........................ 60/226.2; 60/230; 244/110 B
[58] Field of Search ............. 60/226.2, 230; 244/110 B

[56] References Cited

U.S. PATENT DOCUMENTS

| 4,485,970 | 12/1984 | Fournier et al. | 60/226.2 |
|---|---|---|---|
| 4,894,985 | 1/1990 | Dubois et al. | 60/226.2 |
| 4,916,895 | 4/1990 | Dubois | 60/226.2 |
| 4,960,243 | 10/1990 | Dubois et al. | 60/226.2 |
| 5,003,770 | 4/1991 | Schegerin et al. | 60/226.2 |
| 5,039,171 | 8/1991 | Lore | 60/230 |
| 5,040,730 | 8/1991 | Hogie et al. | 60/230 |
| 5,046,307 | 9/1991 | Matta et al. | 60/226.2 |
| 5,117,630 | 6/1992 | Cariola et al. | 60/230 |

FOREIGN PATENT DOCUMENTS

| 0281455 | 9/1988 | European Pat. Off. | 60/226.2 |
|---|---|---|---|
| 2219776 | 12/1989 | United Kingdom | 60/226.2 |

Primary Examiner—Richard A. Bertsch
Assistant Examiner—Howard Richman
Attorney, Agent, or Firm—Charles E. Baxley

[57] ABSTRACT

An improvement made to jet-engine thrust reversers and, more particularly, to reversers called tilting-door reversers. The doors are equipped, on their upstream portion, with a flow-deflecting overlay 90 which, in the open-door position, is in a position close to a line PM parallel to the axis of the engine 1, the overlay making with the inner door skin an angle B greater than 90°, preferably between 105° and 110°. The invention is more particularly applicable to dual-flow engines.

7 Claims, 5 Drawing Sheets

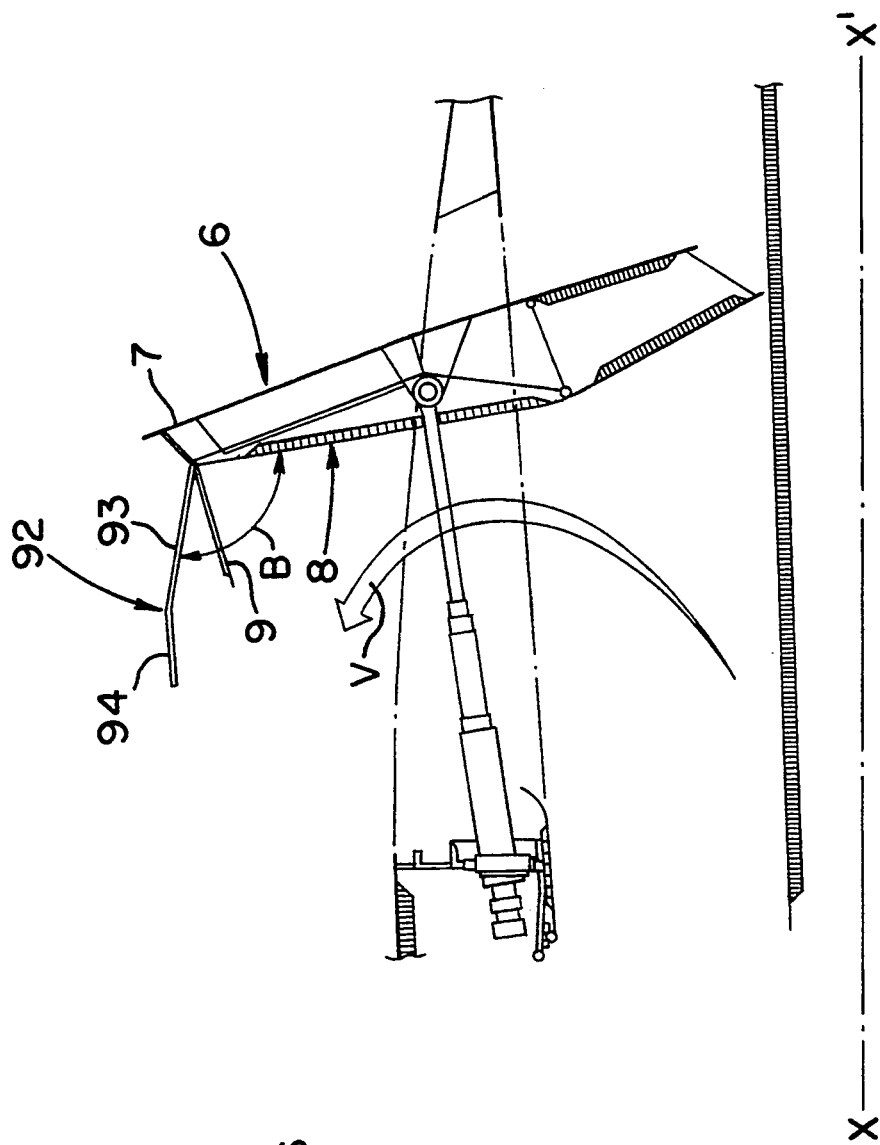
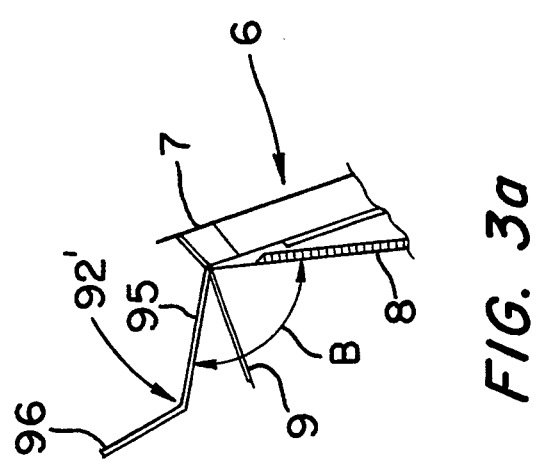

JET-ENGINE THRUST REVERSERS

The present invention relates to a thrust reverser for a dual-flow jet engine.

This known type of engine comprises a central engine body generating a flow of hot gases constituting a main ejection stream, the engine body being surrounded by a peripheral cowling spaced away from the engine body in order to define with the latter an annular channel where a cold flow of gas originating from a fan located upstream of the engine circulates. In this type of engine, the actual thrust reverser consists of tilting doors capable, in the closed or cruise position, of being integrated into the wall of the cowling so as to clear the cold-flow annular channel and, in the deployed or thrust-reversal position, of tilting in order to shut off the said annular channel and to clear, in the cowling, passages permitting an outward and forward deflection of the cold flow, each of the reverser doors having an outer skin and an inner skin and being equipped, on its upstream end, with an overlay extending transversely from the inner door skin and whose role is to facilitate the orientation of the flow deflected upstream.

The present invention intends to make improvements to this type of reverser by a modification of the overlay enabling the effectiveness of the reversing action to be increased while increasing the flow rate of the reversed cold flow.

In fact, it has been possible to establish that for certain arrangements of reversers, especially those used for engines pod-mounted laterally, the geometry of the doors known to date led to a limitation in the efficiency of the engine and the flow rate of the reversed flow. The arrangements of the invention enable this drawback to be remedied by simultaneously improving the efficiency of the engine and the flow rate of the reversed flow.

According to the invention, this improvement is obtained by virtue of the fact that the overlay is set at an angle in relation to the inner skin of the doors such that, in the deployed or thrust-reversing position, the overlay makes an angle of ±20° in relation to a line parallel to the axis of the engine.

In order to achieve this, the angle made by the overlay and the inner door wall is arranged, contrary to the arrangements known to date, so as to be greater than 90° and preferably to lie between 105° and 110°.

According to another characteristic of the invention, because of the inclination of the overlay, the aim is for the section located in the plane passing through the upstream end of the overlay and the upstream edge of the passage made in the cowling for the reversal, in the door reversed position, to be at least equal to the section of the said passage made in the cowling, such that the reversed-flow stream undergoes the smallest possible throttling effect due to the deflection.

Moreover, the configuration of the overlay itself may be varied. Thus, the overlay may be constituted, in a manner known per se, by a plane plate or alternatively it may have a curved profile having concavity oriented towards the interior of the doors or indeed a dihedral-shaped profile, that is to say having two different slopes. Further, it will be understood that, for any one door, depending on the geometry of the latter, the angle which the overlay makes with the interior wall of the doors may vary in the direction of the length of the overlay and may vary between 90° and 110°.

The invention will now be described, by way of non-limiting example, with reference to the attached drawings in which:

BRIEF DESCRIPTION OF THE DRAWINGS

FIGS. 3 and 3a show two other embodiments of the dihedral-shaped overlay of the invention;

In FIG. 1 has been represented diagrammatically in solid lines a known type of door reverser. There are indicated, by 1 the engine axis X-X', by M the wall of the central engine body and, (generally) by 2 a peripheral cowling surrounding the engine body and including an outer wall 3 and an inner wall 4 delimiting, with the wall M, a peripheral channel C in which flows a gas flow 5, originating from an upstream fan (not shown) for example.

Figure 1:
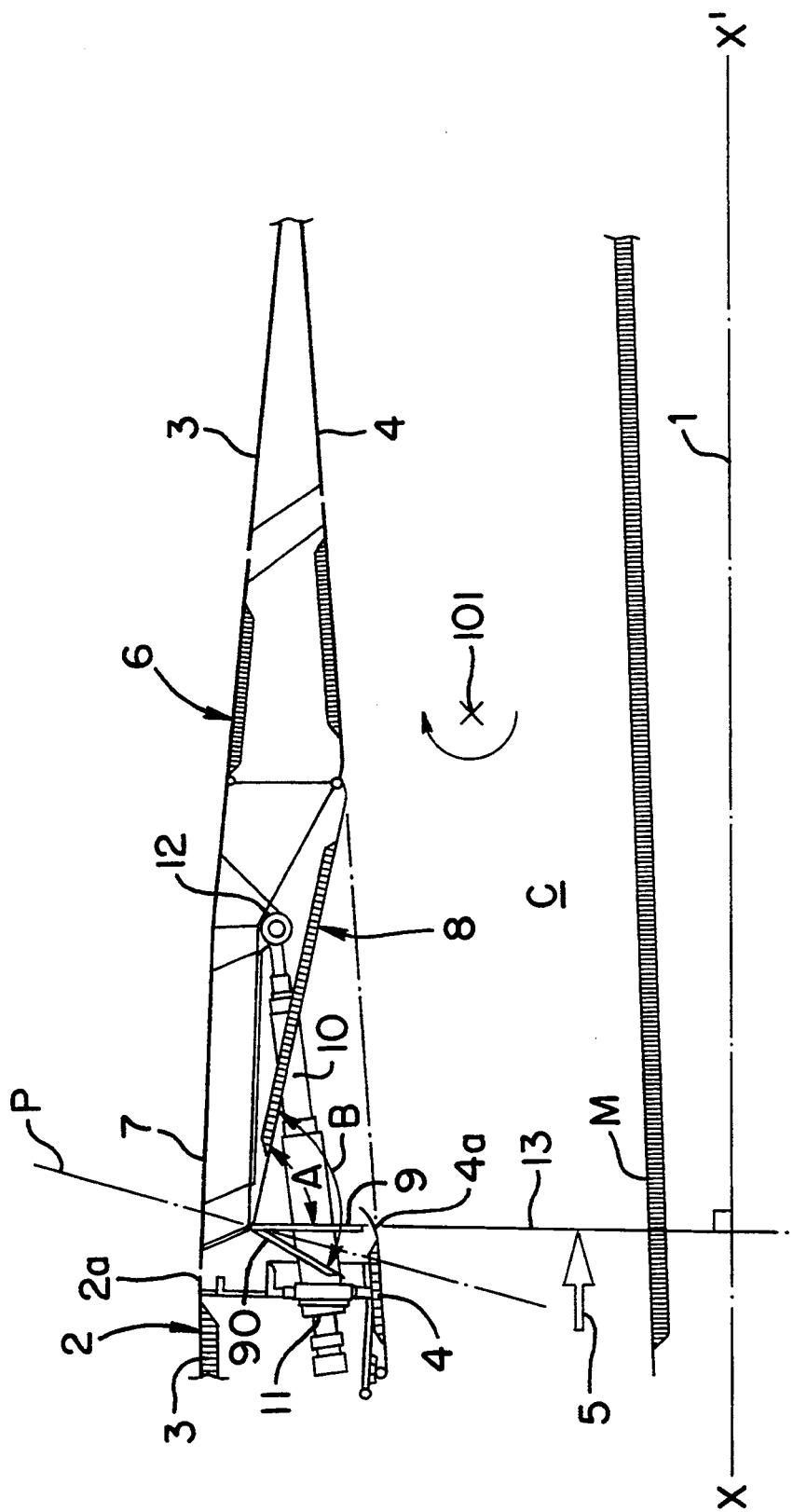
FIG. 1 represents diagrammatically, in cross section, the rear zone of an engine of known type, equipped with a door reverser represented in the closed or cruise position.

Tilting doors, one is designated generally by 6, which are articulated about axes 101 and which consist of an outer skin 7 and of an inner skin 8, are intended, in the cruise position, to be extended in the continuation of the cowling 2 thereby completely freeing the channel C. These doors are equipped, at the front, with an overlay 9 connected to the skins 7 and/or 8 and extending transversely to the latter. A jack 10, articulated at 11 to the fixed structure of the cowling and at 12 to the door, enables the latter to be tilted as represented in FIG. 2.

As may be seen, the overlay 9 of the known structures extends in the closed door position along a line 13 perpendicular to the engine axis 1 and forms with the inner door skin 8 an angle A less than 90° (the line perpendicular to the inner skin is indicated by P). On the other hand, according to the invention, it is arranged that the overlay has the position represented at 90, making with the inner door skin 8 an angle B greater than 90°.

It will also be possible, as represented at 4a, to provide a curved part in the continuation of the inner wall 4 of the cowling in order to faciliate the guiding of the deflected flow when the doors are opened.

Figure 2:
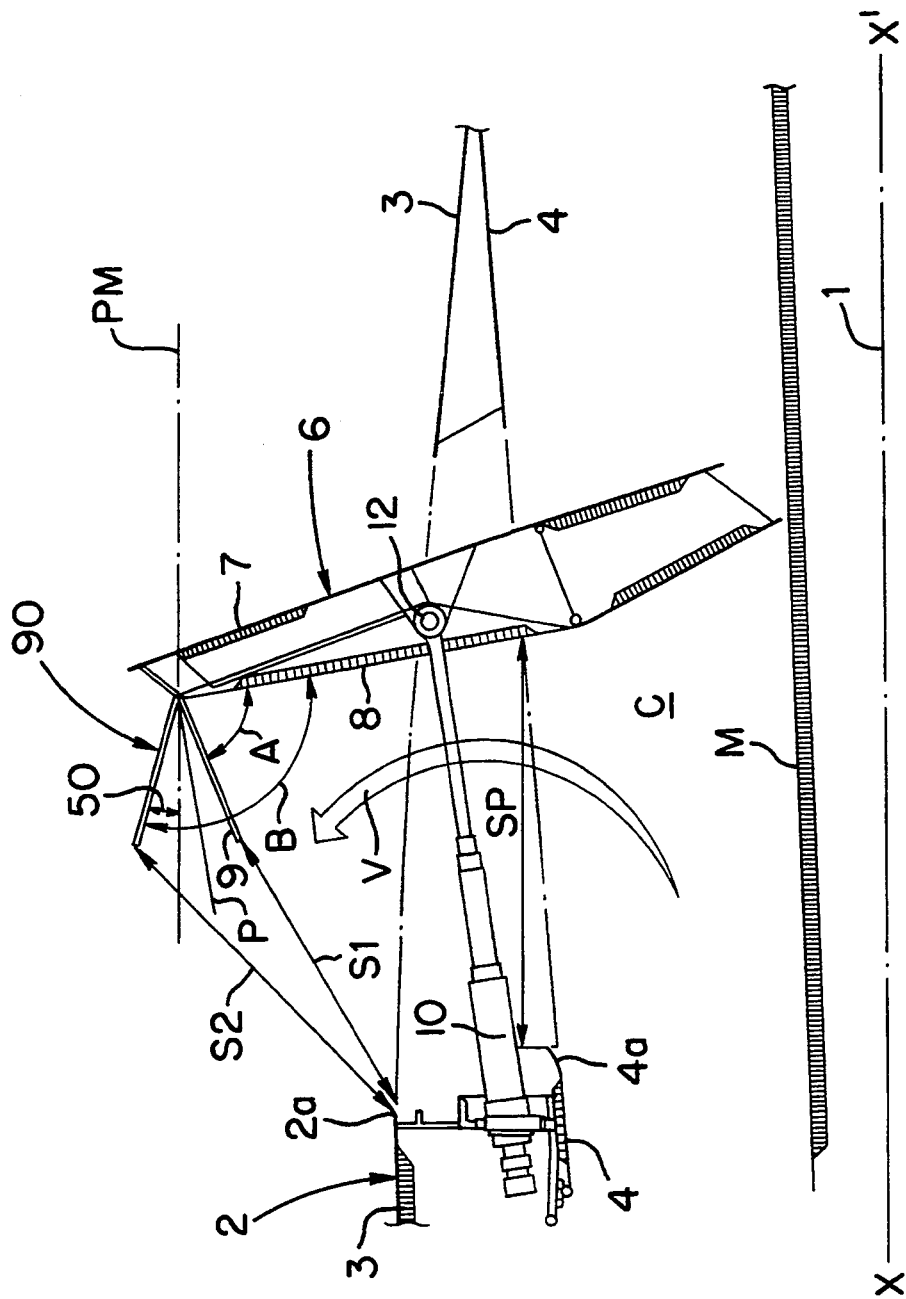
FIG. 2 represents a reverser according to the invention showing a door in the deployed or reversal position, the overlay being produced according to a first embodiment.

FIG. 2 represents diagrammatically a door 6 equipped with the overlay according to the invention in the deployed position.

In FIGS. 1 and 2, the overlay 90 corresponds to a first embodiment and has the shape of a plane plate. The angle B between the inner skin 8 and the overlay 90 lies between 105° and 110°.

In the opened door position, the overlay 90 is above the line PM parallel to the engine axis 1, the angle 50 between the line PM and the overlay being less than 20° and preferably less than 10°.

It may be clearly seen in FIG. 2 that, in the case of the conventional overlay indicated by broken lines at 9, the cold-flow deflected stream V is disrupted in its movement, whereas the raising of the overlay at 90 according to the invention enables the effectiveness to be increased by having a section S2, between the upstream edge of the overlay 90 and the downstream border 2a of the reversal passage created by the tilting of the door, which is greater than the section S1 made, in the case of an overlay 9, between the latter and the border 2a. It is understood that it is easier to obtain a section S2 at least equal to, if not greater than, the section SP for passage of the cold flow in the region of the passage in the cowling, this section SP being measured between the curved plate 4a and the door 6.

In the embodiment of FIG. 3, a dihedral-shaped overlay 92 has been provided, that is to say with a portion 93 forming an obtuse angle B and continued by a portion 94 which is lowered towards the door interior, the assembly creating an inner concavity.

Another arrangement with a dihedral-shaped overlay 92' is represented in FIG. 3a, but here the dihedron is reversed, that is to say that a first portion 95 forms an obtuse angle B with the door, the portion 95 being continued by a portion 96 raised outwards.

Figure 4:
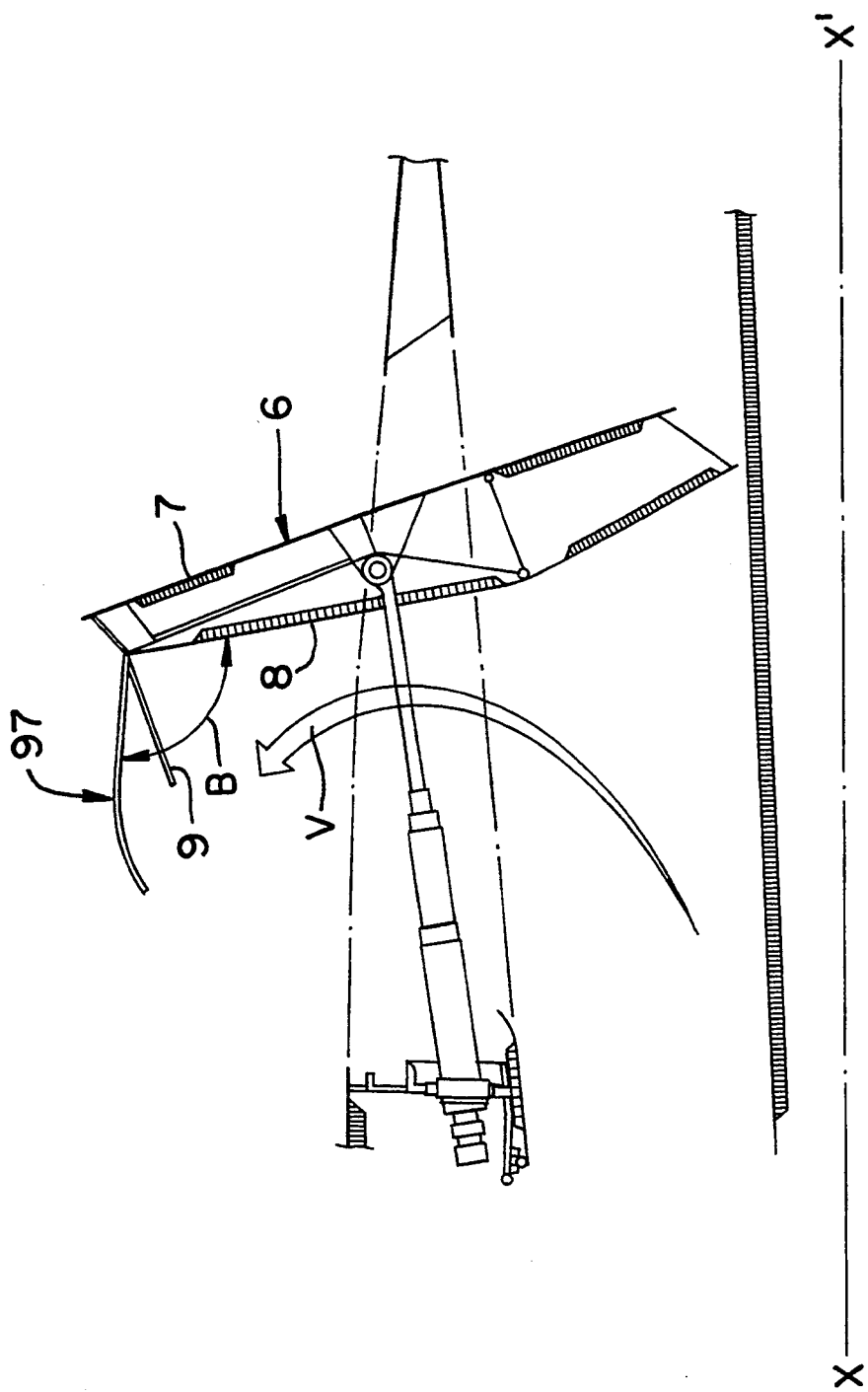
FIG. 4 represents a hollow overlay shape.

FIG. 4 shows an alternative embodiment in which the overlay 97 has a slightly curved shape with concavity oriented towards the door interior, the angle B still being greater than 90°.

Figure 5:
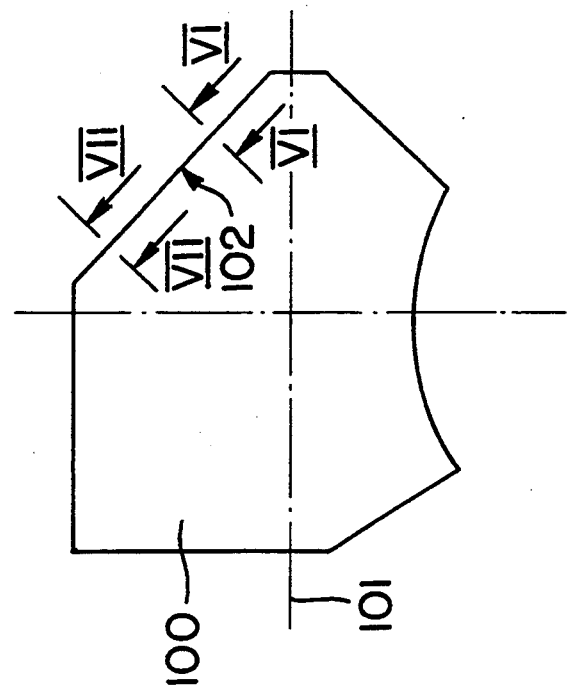
FIG. 5 represents diagrammatically a reverser door according to the invention seen in plan view and having cut corners, and, FIGS. 6 and 7 are cross sections along the lines VI—VI and BB of FIG. 5 showing a varying inclination of the overlay.
Figure 6:
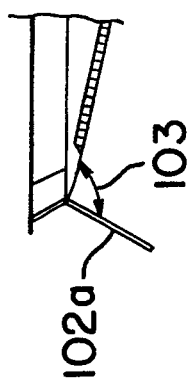
Figure 7:
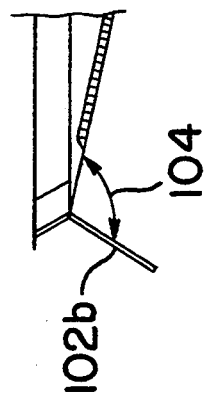

As has been indicated already, the invention has a particularly beneficial application in the case of doors 100 having cut corners as is represented in plan view in FIG. 5. Doors having cut corners are conventional and have been shown in FIG. 1 of U.S. Pat. No. 5,046,307, issued to R. K. Matta. In this case, it may be that the inclination of the overlay 102, along the cut corners, has a variable inclination. Thus at one end of the overlay 102, as shown in FIG. 6 at 102a, the angle 103 between overlay and door interior is smaller or larger than the angle 104 (for example 120°) measured at the other end 102b (cross section B—B).

Of course, the invention is not- to be considered as limited to the examples represented, but extends to all modifications or additions available to a person skilled in the art.

What is claimed is:

1. A thrust reverser for a dual-flow jet engine, the engine having a longitudinal axis and a forward flight direction, the engine comprising a central engine body and a peripheral cowling spaced away from the engine body to define with it an annular flow channel for cold air flow, the cowling provided with an inner air flow surface and an outer air flow surface, and defining at least one lateral vent which is lateral relative to the longitudinal axis, the thrust reverser comprising in combination:

at least one thrust reversing door having an upstream edge, a downstream edge, an inner skin and an outer skin;

attaching means for pivotally attaching the door to the cowling;

moving means for moving the door between a cruise position wherein the door closes the lateral vent and the inner skin conforms flushly with the inner air flow surface of the cowling whereby flow through the annular flow channel is unimpeded and the outer skin conforms flushly with the outer air flow surface of the cowling; and a deployed position wherein the door shuts the annular channel and the lateral vent is opened to direct the cold air flow outwardly through the lateral vent to produce a thrust oriented upstream toward the forward flight direction;

an overlay having a proximal edge and a distal edge, the overlay connected along the proximal edge to the door in the vicinity of the upstream edge such that the overlay is movable with the door from the cruise position wherein the distal edge of the overlay does not extend beyond the inner skin of the door thereby allowing the inner skin to be flush with the inner air flow surface of the cowling; and the deployed position wherein the overlay extends with its distal edge laterally beyond the inner skin so as further to orient said thrust upstream;

the overlay in it deployed position being outward relative to the longitudinal axis and making a positive angle with a line parallel to said longitudinal axis which angle is greater than zero and less then 20 degrees.

2. A thrust reverser according to claim 1, wherein the angle made by the overlay and the line parallel to the longitudinal axis is less than 10 degrees.

3. A thrust reverser according to claim 1, wherein an angle made by the overlay and the inner skin of the door is between 105 degrees and 110 degrees.

4. A thrust reverser according to claim 1, wherein the overlay comprises a planar plate.

5. A thrust reverser according to claim 1, wherein the overlay has a curved cross-section with concavity oriented toward the interior of the door.

6. A thrust reverser according to claim 1, wherein the overlay is provided with a dihedral-shaped cross-section.

7. A thrust reverser according to claim 1 wherein, with the door and the overlay in said deployed positions, a cross-sectional area of the lateral vent located in a plane passing through the distal edge of the overlay and an edge of an outer skin of the cowling which is adjacent the upstream edge of the door, when the door is in its cruise position, is at least equal to a cross-sectional area of the lateral vent located in a plane parallel to the longitudinal axis and passing through an edge of an inner skin of the cowling adjacent the upsteam edge of the door, when the door is in its cruise position.

* * * * *